United States Patent
Penner et al.

(10) Patent No.: US 10,475,088 B2
(45) Date of Patent: Nov. 12, 2019

(54) ACCOUNTING FOR ONLINE SYSTEM USER ACTIONS OCCURRING GREATER THAN A REASONABLE AMOUNT OF TIME AFTER PRESENTING CONTENT TO THE USERS WHEN SELECTING CONTENT FOR USERS

(71) Applicant: Facebook, Inc., Menlo Park, CA (US)

(72) Inventors: Kevin Penner, Culver City, CA (US); Gunjit Singh, San Francisco, CA (US); Andrew Donald Yates, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 580 days.

(21) Appl. No.: 15/215,587

(22) Filed: Jul. 21, 2016

(65) Prior Publication Data
US 2018/0025390 A1  Jan. 25, 2018

(51) Int. Cl.
G06Q 30/02 (2012.01)
(52) U.S. Cl.
CPC ..... *G06Q 30/0277* (2013.01); *G06Q 30/0255* (2013.01); *G06Q 30/0275* (2013.01)
(58) Field of Classification Search
None
See application file for complete search history.

(56) References Cited

U.S. PATENT DOCUMENTS

| | | | | |
|---|---|---|---|---|
| 2012/0166520 A1* | 6/2012 | Lindsay | ............. | G06Q 30/0241 709/203 |
| 2013/0080526 A1* | 3/2013 | Gill | .......... | G06Q 10/10 709/204 |
| 2013/0085859 A1* | 4/2013 | Sim | .......... | G06Q 30/02 705/14.58 |
| 2013/0232159 A1* | 9/2013 | Daya | ............ | G06Q 50/01 707/758 |
| 2014/0122472 A1* | 5/2014 | Wells | ............. | G06F 17/30864 707/732 |

\* cited by examiner

Primary Examiner — Jamie R Kucab
(74) Attorney, Agent, or Firm — Fenwick & West LLP

(57) ABSTRACT

An online system optimizes selection content items for a user based on total value of presenting a selected content item, rather than discrete actions with the content item. To account for the total value of presenting a content item, the online system receives information from a third party system associated with the content item identifying actions by users captured by the third party system and values associated with the identified actions. The online system matches the identified actions with presentations of the content item to various users by identifying users of the online system corresponding to information identifying users received from the third party system and retrieves information describing presentation of content items to the information identifying presentation of content items. Based on historical actions and presentations of a content item, the online system obtains a model determining value of presenting a content item for use in selecting content.

20 Claims, 3 Drawing Sheets

ACCOUNTING FOR ONLINE SYSTEM USER ACTIONS OCCURRING GREATER THAN A REASONABLE AMOUNT OF TIME AFTER PRESENTING CONTENT TO THE USERS WHEN SELECTING CONTENT FOR USERS

BACKGROUND

This disclosure relates generally to online systems, and more specifically to selecting content to online system users based on actions by the users greater than a reasonable amount of time after presentation of the content.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Additionally, many online systems commonly allow publishing users (e.g., businesses) to sponsor presentation of content on an online system to gain public attention for a user's products or services or to persuade other users to take an action regarding the publishing user's products or services. Content for which the online system receives compensation in exchange for presenting to users is referred to as "sponsored content." Many online systems receive compensation from a publishing user for presenting online system users with certain types of sponsored content provided by the publishing user. Frequently, online systems charge a publishing user for each presentation of sponsored content to an online system user or for each interaction with sponsored content by an online system user. For example, an online system receives compensation from a publishing user each time a content item provided by the publishing user is displayed to another user on the online system or each time another user is presented with a content item on the online system and interacts with the content item (e.g., selects a link included in the content item), or each time another user performs another action after being presented with the content item.

However, users providing content items to an online system may benefit more from user actions occurring greater than a reasonable amount of time after content items were presented to online system users. For example, changes in particular user actions over a relatively longer time interval between users who were presented with a content item and users who were not presented with a content item may provide a publishing user with a more accurate measure of the content item's effectiveness in achieving goals of a user providing a content item. As another example, user actions occurring greater than the reasonable amount of time after presentation of a content item allow a publishing user to generate content causing users to retain awareness of content for a longer duration. In another example, user actions occurring greater than the reasonable amount of time after presentation of a content item are actions that are causally disconnected from presentation of the content item, so conventional tracking methods, such as tracking pixels, are unable to readily identify the occurrence of the actions. While conventional online systems often account for likelihoods of user interaction with content items when selecting content items, the conventional online systems merely account for likelihoods of interactions performed by users recently after presentation of content items, which may not accurately predict or account for actions by users greater than the reasonable amount of time after presentation of content. Additionally, conventional online systems are often unable to account for values that a publishing user associates with different user actions, which prevents conventional online systems from optimizing the value to a publishing user of presenting content items provided to an online system by the publishing user.

SUMMARY

An online system receives content items for presentation to one or more users of the online system. Some of the content items include targeting criteria specifying characteristics of users eligible to be presented with the content items. A content item including targeting criteria is eligible to be presented to users having characteristics satisfying at least a threshold number of the targeting criteria. Additionally, some content items may be associated with bid amounts, where a bid amount associated with a content item specifies an amount of compensation received by the online system from a user associated with the content item in exchange for presenting the content items to one or more users. Content items may be associated with third party systems 130

To select content items for presentation to the user, the online system may account for how a user or a third party system associated with content items received by the online system or a third party system from which the online system received content items values actions performed by other users when presented with the content items. For example, the online system maintains one or more models that determine likelihoods of users performing one or more actions with content items that may account for values, or relative importance, of various actions to a third party system or to a user associated with content item received by the online system. A model determines a likelihood of the user performing an interaction with a content item based on characteristics of the user (e.g., prior interactions performed by the user, characteristics of content items with which the user interacted, connections between the user and other users or objects, demographic information of the user, etc.), characteristics of the content item (e.g., one or more topics associated with the content item, types of content included in the content item, etc.), and a value of the interaction with the content item to a user or to a third party system associated with the content item.

However, a third party system, or a user, associated with a content item may value one or more actions with a content item that occur after a reasonable amount of time from presentation of the content item to users. For example, actions occurring after the reasonable amount of time from presentation of the content item are actions that have yet to occur (e.g., a user recalling seeing the content a particular time interval ago, a user receiving a message from another user or entity associated with the content, a user taking an action or going to a physical location a threshold amount of time after viewing a content item). As another example, an action may occur after the reasonable amount of time from presentation of the content item because the online system does not receive information from a third party system that captured information describing the action until after the reasonable amount of time from presentation of the content item has passed. In another example, actions occurring after the reasonable amount of time from presentation of the content item are actions that occur greater than a threshold amount of time after presentation of the content item. For example, an increase in a particular user action (e.g., purchases of a product associated with the content item, downloads of an application associated with the content item, etc.) after presentation of the content item relative to occurrences of the particular user action without presentation of the content item may be more important to a user who provided the content item to the online system than interactions with the content item occurring closer in time to presentation of the content item. Additionally, actions occurring greater than the reasonable amount of time after presentation of a content item may be actions that are causally disconnected from presentation of the content item, so conventional tracking methods, such as tracking pixels, are unable to readily identify the occurrence of the actions. As other examples, purchases of a product associated with a content item six months after presentation of the content item or visits by users presented with the content item ten months after presentation of the content item may be actions that are valuable to the user or to the third party system associated with the content item to the online system that occur after the reasonable amount of time from presentation of the content item. Hence, increasing certain actions by users after presentation of a content item, such as actions occurring after the reasonable amount of time from presentation of the content item, may provide a greater benefit to the user or to the third party system who provided the presented content item to the online system than users performing other actions, such as actions within the reasonable amount of time from presentation of the content item (e.g., sharing the content item, expressing a preference for the content item, providing a comment on the content item). However, the online system often does not initially have information identifying how the user or the third party system associated with a presented content item values various actions occurring after presentation of the content item or that actions occurring after the reasonable amount of time from presentation of the content item have occurred.

To account for one or more actions performed by the user after the threshold time from presentation of the content item when selecting content for presentation to users, the online system maintains information describing presentation of one or more content items to users of the online system. For example, the online system stores an identifier of a content item in association with an identifier of a user to whom the content item was presented and a time when the content item was presented to the user. In various embodiments, the online system stores any suitable information identifying a user (e.g., a username, an e-mail address, etc.) in association with an identifier of a content item presented to the user and a time when the content item was presented to the user, allowing the online system to identify content items presented to various users and when the content items were presented to various users.

Additionally, the online system receives information from one or more third party systems associated with content items that describe actions performed by users after presentation of the content items to the users. The received information may identify one or more actions performed at least a reasonable amount of time after presentation of content items to users. Information received from a third party system includes information identifying actions performed by users that were captured by the third party system, information used by the third party system to identify users who performed the actions, and values of performed actions to the third party system. For example, the online system receives information used by the third party system to identify a user in association with an action performed by the user that was captured by the third party system and a value of the performed action to the third party system. Alternatively, the online system receives information identifying various actions and values associated with each of the actions by the online system and separately receives information used by the third party system to identify users with actions performed by a user associated with information used by the third party system.

The value to the third party system of an action performed by a user represents a benefit to the third party system of the action. In some embodiments, the value of an action performed by a user to the third party system is a monetary amount indicating revenue obtained by the third party system from the action or because of the action. Alternatively, the value of an action performed by a user to the third party system is an amount of increase in revenue to the third party system because of the action. In other embodiments, the value of an action performed by a user represents an amount of user recognition of the third party system from the action. As another example, the value to the third party system of an action indicates a relative importance of the action to other actions. For example, the value to the third party system is higher for actions that the third party system seeks to encourage relative to the value to the third party system of other actions. Hence, the value to the third party system of an action may be an indication of relative value of different actions to the third party system in some embodiments.

From the information received from the third party system and the maintained information identifying content items presented to users of the online system, the online system identifies users of the online system corresponding to information used by a third party system to identify users who performed the actions. For example, the online system compares received information used by the third party system to identify users who performed one or more actions to information used by the online system to identify users and identifies a user of the online system associated with information used by the online system to identify the user that matches received information used by the third party system to identify a user who performed an action. In some embodiments, the online system receives a username or an e-mail address used by the third party system to identify a user who performed an action and identifies a user of the online system for whom the online system maintains a username or an e-mail address matching the received username or e-mail address.

Alternatively, a content item includes instructions that, when executed by a client device presenting the content item, communicate information from the client device to the online system and to the third party system identifying a user of the client device or identifying the client device. The online system subsequently stores information received from the client device with a user of the online system to whom the content item was presented. Additionally, the third party system associates information received from execution of the instructions with a user who performed an action when transmitting the information describing actions performed by users after presentation of the content items to the users. The online system identifies the user of the online system associated with the information received from execution of the instructions included in the information received from the third party system.

For various identified online system users, the online system obtains information maintained by the online system describing presentation of one or more content items associated with the third party system from which the online system received information that describe actions performed by users after presentation of the content items to the users. For example, the online system determines identifiers of content items associated with the third party system and obtains maintained information including a determined identifier of a content item associated with the third party system associated with a user of the online system corresponding to a user who performed an action included in information received by the online system from the third party system. As the obtained information includes a time when a content item was presented to an identified user in association with the identifier of the content item and information identifying the user of the online system corresponding to a user who performed an action included in information received by the online system from the third party system, the obtained information indicates when the content item associated with the third party system was presented to the user. Hence, the obtained information allows the online system to determine when the content item associated with the third party system was presented to a user of the online system identified by the third party system as having performed an action.

Based on the obtained information describing presentation of the content item associated with the third party system to the identified users, the actions performed by the identified users received from the third party system, and the values of the actions performed by the identified users received from the third party system, the online system generates a model predicting a value to the third party system for presenting a content item. In some embodiments, the online system generates the model by applying weights to likelihoods of a user performing various actions after being presented with a content item and combines the weighted likelihoods to determine the value to the third party system of presenting the content item to a user. A weight associated with a likelihood of the user performing an action is based on the value to the third party system of the action specified by the information received from the third party system, allowing the generated model to more accurately estimate the value of presenting the content item to the third party system. The online system also determines a likelihood of the user performing an action based on characteristics of identified users who performed the action and a number of performances of the action by identified users after being presented with the content item from the obtained information. The online system stores the generated model in association with an identifier of the content item and an identifier of the third party system, allowing subsequent use of the model to determine the value to the third party system of presenting the content item to another user. In some embodiments, the online system generates models for various content items associated with the third party system from the obtained information describing presentation of the content item associated with the third party system to the identified users, the actions performed by the identified users received from the third party system, and the values of the actions performed by the identified users received from the third party system.

After generating the model, the online system identifies an opportunity to present content to a viewing user of the online system. If the viewing user is eligible to be presented with the content item associated with the third party system, the online system includes the content item in association with one or more characteristics determined based on the generated model in one or more selection processes selecting the content for presentation to the viewing user. The viewing user is eligible to be presented with the content item if the viewing user has characteristics accessible to the online system that satisfy at least a threshold number of targeting criteria included in the content item or if the content item does not include targeting criteria. Based on the predicted value of presenting the content item to the viewing user from the generated model, the online system determines or modifies one or more characteristics of the content item.

For example, if the content item includes a bid amount specifying an amount of compensation the online system receives from the third party system for presenting the content item or for users performing actions after being presented with the content item, the online system increases or decreases the bid amount based on the predicted value of presenting the content item to the user determined by the model. As an example, if the predicted value of presenting the content item to the viewing user exceeds a threshold value, the online system increases the bid amount. In some embodiments, the online system increases the bid amount by a quantity that is directly related (e.g., proportional) to an amount by which the value of presenting the content item to the viewing user exceeds the threshold value. Conversely, the online system may decrease the bid amount if the predicted value of presenting the content item to the viewing user is less than an alternative threshold amount; the bid amount may be decreased by an alternative quantity that is directly related (e.g., proportional) to an amount by which the predicted value is less than the alternative threshold amount. Alternatively, the online system modifies a measure of relevance of the content item to the viewing user by a quantity based on an amount that the predicted value of presenting the content item to the viewing user exceeds a threshold value or an amount that the predicted value of presenting the content item to the viewing user is less than an alternative threshold value. In other embodiments, the content item includes instructions for the online system to determine a bid amount associated with the content item in one or more selection processes, and the online system determines the bid amount associated with the content item based on the predicted value of presenting the content item to the viewing user. In response to the one or more selection processes selecting the content item, the online system communicates the content item to a client device associated with the viewing user for presentation.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
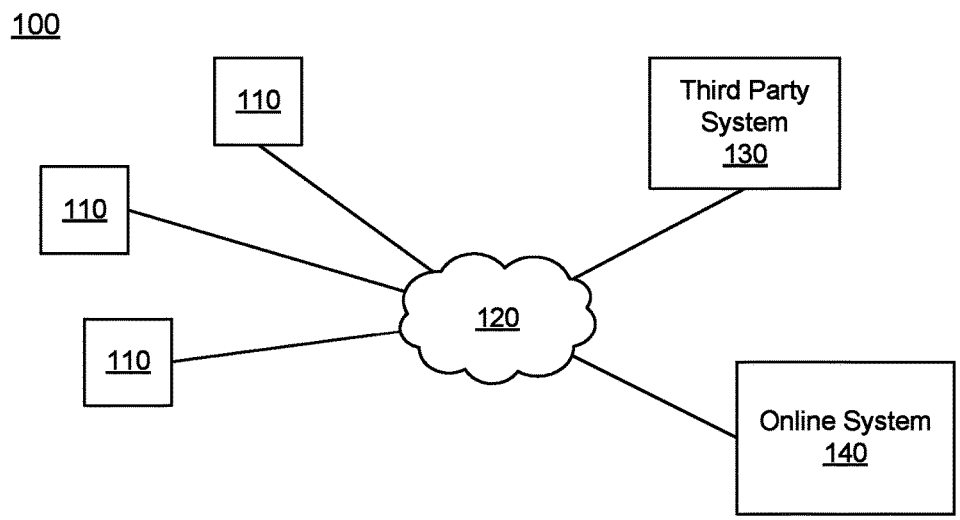
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smart watch or another suitable device. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. In some embodiments, one or more of the third party systems 130 provide content to the online system 140 for presentation to users of the online system 140 and provide compensation to the online system 140 in exchange for presenting the content. For example, a third party system 130 provides content items associated with amounts of compensation provided by the third party system 130 to the online system 140 in exchange presenting the content items to users of the online system 140

Figure 2:
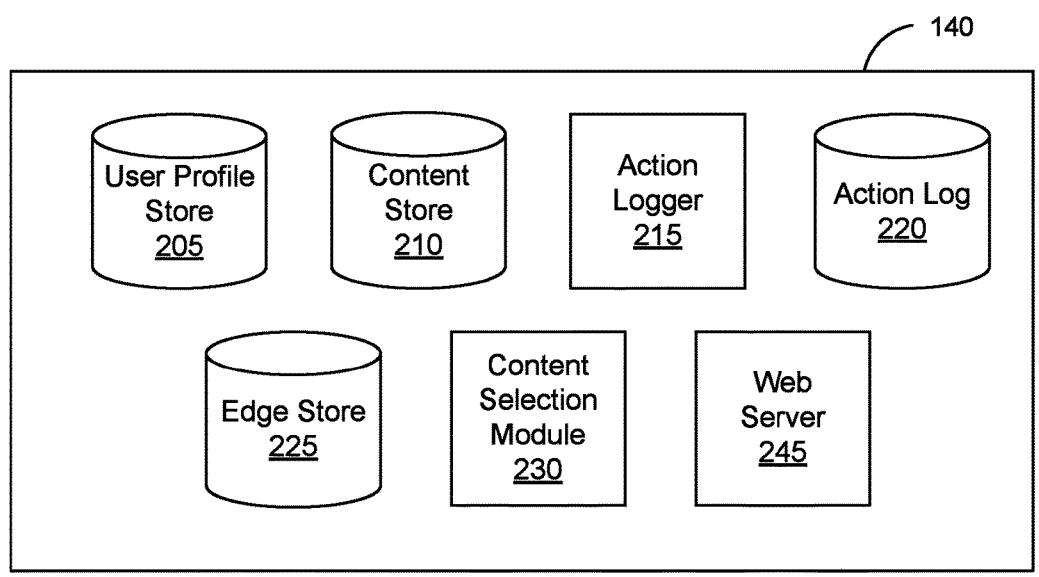
FIG. 2 is a block diagram of an online system, in accordance with an embodiment.

FIG. 2 is a block diagram of architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also includes a landing page specifying a network address to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with content items on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, content items that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various ad requests (or other content items) based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

The content selection module 230 maintains various models that each predict a likelihood of a user performing one or more interactions with a content item (or determining any other suitable value describing interaction with the content item). Models maintained by the content selection module 230 determine likelihoods of a user interacting with a content item based on characteristics of the user and characteristics of the content item. Example models maintained by the content selection module 230 determine a likelihood of a user accessing content item presented to the user, determine a likelihood of the user performing a specific interaction with a content item presented to the user (e.g., expressing a preference for the content item, sharing the content item with another user, commenting on the content item), determine a likelihood of the user performing a specific interaction with an object (e.g., a page, a user, etc.) associated with a content item presented to the user, determine an amount of time the user will view a content item presented to the user, determine any other suitable interaction or likelihood of interaction with a content item presented to the user.

Although models maintained by the content selection module 230 determine likelihoods of the user performing interactions with a content item within a reasonable time from presentation of the content item, various actions users performed after the reasonable time from presentation of the content item are beneficial to a user or to a third party system 130 who provided the presented content item to the online system 140. For example, a user providing the presented content item to the online system 140 may benefit from an increase in occurrences of a particular user action (e.g., purchases of a product associated with the content item, downloads of an application associated with the content item, etc.) by users who were presented with the content item relative to occurrences of the particular user action by users to whom the content item was presented. Increasing the particular user action occurring after the reasonable amount of time from presentation of a content item to users may provide a greater benefit to the user who provided the presented content item to the online system 140 than interactions by users closer in time to presentation of the content item. Additionally, models maintained by the content selection module 230 have limited information about the value of various actions to a user providing content items to the online system 140. While the content selection module 230 maintains models for predicting the likelihoods of users performing various actions when presented with a content item, the models often do not account for how the user providing the content item to the online system 140 values different actions.

To account for how a user providing content items to the online system 140 values different actions by other users who were presented with the content items, such as actions by users at least a reasonable amount of time after presentation of content items when selecting content items, the content selection module 230 receives information from a third party system 130 associated with a content item including information identifying users who performed actions after being presented with the content item and values of the performed actions to the third party system 130. The value to the third party system 130 of an action performed by a user represents a benefit to the third party system 130 of the action. In some embodiments, the value of an action performed by a user to the third party system 130 is a monetary amount indicating revenue obtained by the third party system 130 from the action or because of the action. Alternatively, the value of an action performed by a user to the third party system 130 is an amount of increase in revenue to the third party system 130 because of the action. In other embodiments, the value of an action performed by a user represents an amount of user recognition of the third party system 130 from the action. In other embodiments, the value to the third party system 130 of an action indicates a relative importance of the action to other actions. For example, the value to the third party system 130 is higher for actions that the third party system 130 seeks to encourage relative to the value to the third party system 130 of other actions.

From the information received from the third party system 130, the content selection module 230 identifies users of the online system 140 to whom the content item was presented. For example, the content selection module 230 retrieves information used by the online system 140 to identify users to whom the content item was presented from the action log 220 or from the content store 210 and identifies users for whom information used by the online system 140 to identify the users matches information identifying users in the information received from the third party system 130. As further described below in conjunction with FIG. 3, based on information from the action log 220 or from the content store 210 for the identified users as well as the actions performed by the identified users and the values of the performed actions from the received information, the content selection module 230 generates a model that predicts a value of presenting the content item to users of the online system 140. The model predicts the value of presenting the content item based on characteristics of users to whom the content item was presented and who performed an action after being presented with the content item and values of actions performed by users who were presented with the content item. After generating the model, when the content selection module 230 identifies an opportunity to present the content item to a viewing user, the content selection module 230 determines one or more characteristics (e.g., a bid amount, a measure of relevance) of the content item that are associated with the content item in one or more selection processes used to select content for presentation to the viewing user 230. As the predicted value of presenting the content item to the viewing user affects one or more characteristics of the content item used when selecting content, the predicted value increases or decreases a likelihood of the content item being presented to the viewing user, as further described below in conjunction with FIG. 3.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Selecting Content Based on Valuation of User Actions by Users Providing Content

Figure 3:
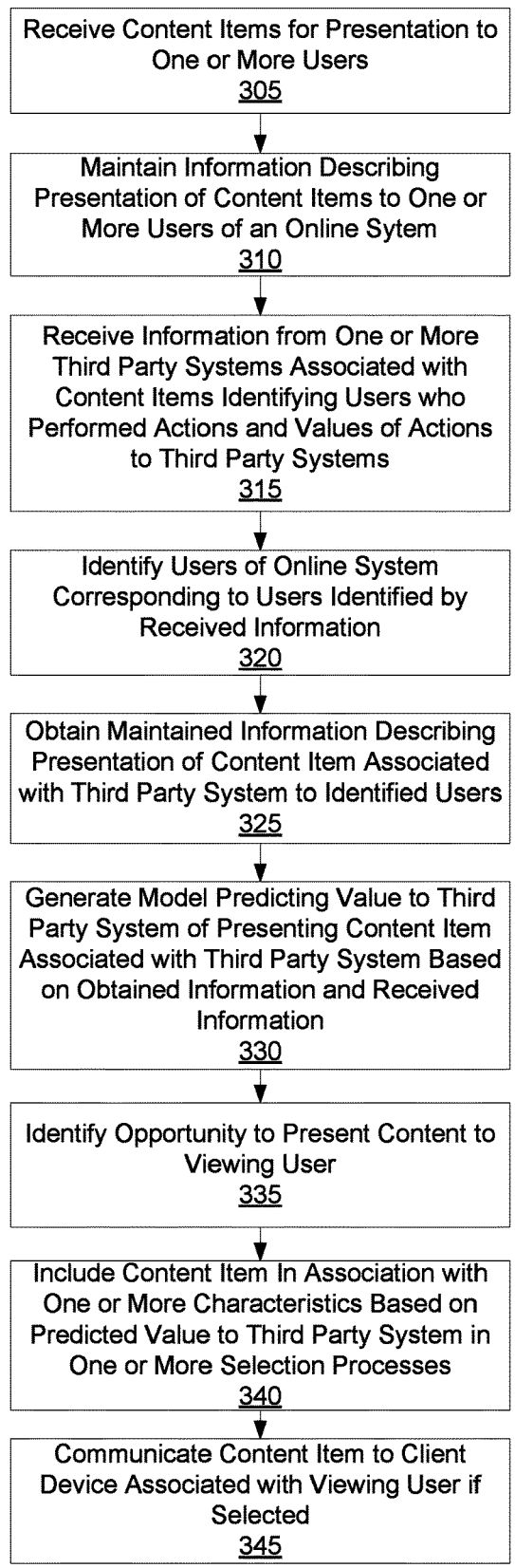
FIG. 3 is a flowchart of a method for selecting content items for presentation to a user based on values of various actions by a user presented with content items to a user providing the content items to an online system, in accordance with an embodiment.

FIG. 3 is a flowchart of one embodiment of a method for selecting content items for presentation to a user based on values of various actions by a user presented with content items to a user providing the content items to an online system 140. In other embodiments, the method may include different and/or additional steps than those shown in FIG. 3. Additionally, steps of the method may be performed in different orders than the order described in conjunction with FIG. 3 in various embodiments.

An online system 140 receives 305 content items for presentation to one or more users of the online system 140. Some of the content items include targeting criteria specifying characteristics of users eligible to be presented with the content items. As described above in conjunction with FIG. 2, a content item including targeting criteria is eligible to be presented to users having characteristics satisfying at least a threshold number of the targeting criteria. Additionally, some content items may be associated with bid amounts, where a bid amount associated with a content item specifies an amount of compensation received by the online system 140 from a user associated with the content items in exchange for presenting the content items to one or more users. The content items may be received 305 from users of the online system 140 or from third party systems 130 that communicate with the online system 140. Additionally, the online system 140 may generate one or more of the content items based on data accessible to the online system 140.

To select content items for presentation to the user, the online system 140 may account how a user or a third party system 130 associated with content items values actions performed by other users when presented with the content items. For example, the online system 140 maintains one or more models that determine likelihoods of users performing one or more actions with content items that may account for values, or relative importance, of various actions to a third party system 130 or to a user providing a content item to the online system 140. As further described above in conjunction with FIG. 2, different models determine likelihoods of the user performing different actions with content items. A model determines a likelihood of the user performing an interaction with a content item based on characteristics of the user (e.g., prior interactions performed by the user, characteristics of content items with which the user interacted, connections between the user and other users or objects, demographic information of the user, etc.), characteristics of the content item (e.g., one or more topics associated with the content item, types of content included in the content item, etc.), and a value of the interaction with the content item to a user or to a third party system 130 associated with the content item.

However, a third party system 130 (or a user) associated with an obtained content item may value certain actions more than other actions. For example, the third party system 130 may value one or more actions with a content item that occur after a reasonable amount of time from presentation of the content item to users or one or more actions that occur after presentation of the content item to users but are not directly causally related to presentation of the content item, making those actions difficult to identify through conventional tracking mechanisms (e.g., tracking pixels). For example, actions occurring after the reasonable amount of time from presentation of the content item are actions that have yet to occur (e.g., a user recalling seeing the content a particular time interval ago, a user taking an action or going to a physical location a threshold amount of time after viewing a content item). As another example, an action may occur after the reasonable amount of time from presentation of the content item because the online system 140 does not receive information from a third party system 130 that captured information describing the action until after the reasonable amount of time from presentation of the content item has passed. In another example, actions occurring after the reasonable amount of time occur greater than a threshold amount of time after presentation of the content item. For example, an increase in a particular user action (e.g., purchases of a product associated with the content item, downloads of an application associated with the content item, etc.) after presentation of the content item relative to occurrences of the particular user action without presentation of the content item may be more important to a user who provided the content item to the online system 140 than interactions with the content item occurring closer in time to presentation of the content item. Additionally, actions occurring greater than the reasonable amount of time after presentation of a content item may be actions that are causally disconnected from presentation of the content item, so conventional tracking methods, such as tracking pixels, are unable to readily identify the occurrence of the actions. As other examples, purchases of a product associated with a content item six months after presentation of the content item or visits by users presented with the content item ten months after presentation of the content item may be actions that are valuable to the user or to the third party system 130 associated with the content that occur after the reasonable amount of time from presentation of the content item. Hence, increasing one or more interactions by users with a presented content item after the reasonable amount of time from presentation of the content item may provide a greater benefit to the user or to the third party system 130 associated with the presented content item to the online system 140 than users performing other actions within the reasonable amount of time from presentation of the content item (e.g., sharing the content item, expressing a preference for the content item, providing a comment on the content item). However, the online system 140 often does not initially have information identifying how the user or the third party system 130 associated with a presented content item was received values actions occurring after the reasonable amount of time from presentation of the content item or that actions occurring after the reasonable amount of time from presentation of the content item have occurred.

To account for different values of one or more actions performed by the user after presentation of the content item to the third party system 130 from which the content item was received 305 when selecting content for presentation to users, the online system 140 maintains 310 information describing presentation of one or more content items to users of the online system 140. For example, the online system 140 stores an identifier of a content item in association with an identifier of a user to whom the content item was presented and a time when the content item was presented to the user. In various embodiments, the online system 140 stores any suitable information identifying a user (e.g., a username, an e-mail address, etc.) in association with an identifier of a content item presented to the user and a time when the content item was presented to the user, allowing the online system 140 to maintain 310 information identifying content items presented to various users and when the content items were presented to various users.

Additionally, the online system 140 receives 315 information from one or more third party systems 130 associated with content items that describe actions performed by users after presentation of the content items to the users. The received information may identify one or more actions performed at least a reasonable amount of time after presentation of content items to users. Information received 315 from a third party system 130 includes information identifying actions performed by users that were captured by the third party system 130, information used by the third party system 130 to identify users who performed the actions, and values of performed actions to the third party system 130. For example, the online system 140 receives 315 information used by the third party system 130 to identify a user in association with an action performed by the user that was captured by the third party system 130 and a value of the performed action to the third party system 130. Alternatively, the online system 140 receives 315 information identifying various actions and values associated with each of the actions by the online system 140, and separately receives 315 information used by the third party system 130 to identify users with actions performed by a user associated with information used by the third party system 130.

The value to the third party system 130 of an action performed by a user represents a benefit to the third party system 130 of the action. In some embodiments, the value of an action performed by a user to the third party system 130 is a monetary amount indicating revenue obtained by the third party system 130 from the action or because of the action. Alternatively, the value of an action performed by a user to the third party system 130 is an amount of increase in revenue to the third party system 130 because of the action. In other embodiments, the value of an action performed by a user represents an amount of user recognition of the third party system 130 from the action. In other embodiments, the value to the third party system 130 of an action indicates a relative importance of the action to other actions. For example, the value to the third party system 130 is higher for actions that the third party system 130 seeks to encourage relative to the value to the third party system 130 of other actions. Hence, the value to the third party system 130 of an action may be an indication of relative value of different actions to the third party system 130 in some embodiments.

From the information received 315 from the third party system 130 and the maintained information identifying content items presented to users of the online system 140, the online system 140 identifies 320 users of the online system corresponding to information used by a third party system 130 to identify users who performed the actions. For example, the online system 140 compares received information used by the third party system 130 to identify users who performed one or more actions to information used by the online system 140 to identify users, and identifies 320 a user of the online system 140 associated with information used by the online system 140 to identify the user that matches received information used by the third party system to identify a user who performed an action. In some embodiments, the online system 140 receives 315 a username or an e-mail address used by the third party system 130 to identify a user who performed an action and identifies 320 a user of the online system 140 for whom the online system 140 maintains a username or an e-mail address matching the received username or e-mail address.

Alternatively, a content item includes instructions that, when executed by a client device 110 presenting the content item, communicate information from the client device 110 to the online system 140 and to the third party system 130 identifying a user of the client device 110 or identifying the client device 110. The online system 140 subsequently stores information received from the client device 110 with a user of the online system 140 to whom the content item was presented. Additionally, the third party system 130 associates information received from execution of the instructions with a user who performed an action when transmitting the information describing actions performed by users after presentation of the content items to the users. The online system 140 identifies 320 the user of the online system 140 associated with the information received from execution of the instructions included in the information received 315 from the third party system 130. Hence, an identifier included in information communicated to the third party system 130 and to the online system 140 when instructions in a content item are executed by a client device 110 presenting the content item to a user allow the online system 140 to identify 320 a user of the online system 140 corresponding to a user who performed an action included in information received 310 by the online system 140 from the third party system 130.

For various identified online system users, the online system 140 obtains 325 information maintained 310 by the online system 140 describing presentation of one or more content items associated with the third party system 130 from which the online system received 315 information that describe actions performed by users after presentation of the content items to the users. For example, the online system 140 determines identifiers of content items associated with the third party system 130 and obtains 325 maintained information including a determined identifier of a content item associated with the third party system 130 associated with a user of the online system 140 corresponding to a user who performed an action included in information received 310 by the online system 140 from the third party system 130. As the obtained information includes a time when a content item was presented to a user in association with the identifier of the content item and information identifying the user of the online system 140 corresponding to a user who performed an action included in information received 310 by the online system 140 from the third party system 130, the obtained information indicates when the content item associated with the third party system 130 was presented to the user. Hence, the obtained information allows the online system 140 to determine when the content item associated with the third party system 130 was presented to a user of the online system 140 identified by the third party system 130 to have performed an action.

Based on the obtained information describing presentation of the content item associated with the third party system 130 to the identified users, the actions performed by the identified users received 310 from the third party system 130, and the values of the actions performed by the identified users received 310 from the third party system 130, the online system 140 generates 330 a model predicting a value to the third party system 130 for presenting a content item. In some embodiments, the online system 140 generates 330 the model by applying weights to likelihoods of a user performing various actions after being presented with a content item and combines the weighted likelihoods to determine the value to the third party system 130 of presenting the content item to a user. A weight associated with a likelihood of the user performing an action is based on the value to the third party system 130 of the action specified by the information received 310 from the third party system 130, allowing the generated model to more accurately estimate the value to the third party system 130 of presenting the content item. The online system 140 also determines a likelihood of the user performing an action based on characteristics of identified users who performed the action and a number of performances of the action by identified users after being presented with the content item from the obtained information. The online system 140 stores the generated model in association with an identifier of the content item and an identifier of the third party system 130, allowing subsequent use of the model to determine the value to the third party system 130 of presenting the content item to another user.

In some embodiments, the online system 140 generates models for various content items associated with the third party system 130 from the obtained information describing presentation of the content item associated with the third party system 130 to the identified users, the actions performed by the identified users received 310 from the third party system 130, and the values of the actions performed by the identified users received 310 from the third party system 130. The online system 140 combines the generated models to generate a model predicting a value to the third party system 130 for presenting various content items. The combined model may account for characteristics of various content items for which the online system 140 generated 330 a model, allowing the combined model to predict values of presenting various content items to a user based on characteristics of the content item matching characteristics of other content items previously presented to users prior to the users performing for presenting content item. The online system 140 stores the combined model in association with an identifier of the third party system 130 for subsequent use in selecting content items associated with the third party system 130 for presentation to other users.

After generating 330 the model, the online system 140 identifies 335 an opportunity to present content to a viewing user of the online system 140. For example, the online system 140 receives a request for content from a client device 110 associated with the viewing user. As another example, the client device 110 associated with the viewing user accesses the online system 140.

If the viewing user is eligible to be presented with the content item associated with the third party system 130, the online system 140 includes 340 the content item in association with one or more characteristics determined based on the generated model in one or more selection processes selecting the content for presentation to the viewing user. The viewing user is eligible to be presented with the content item if the viewing user has characteristics accessible to the online system 140 that satisfy at least a threshold number of targeting criteria included in the content item or if the content item does not include targeting criteria. Based on the predicted value of presenting the content item to the viewing user from the generated model, the online system 140 determines or modifies one or more characteristics of the content item.

For example, if the content item includes a bid amount specifying an amount of compensation the online system 140 receives from the third party system 130 for presenting the content item or for users performing actions after being presented with the content item, the online system 140 increases or decreases the bid amount based on the predicted value of presenting the content item to the user determined by the model. As an example, if the predicted value of presenting the content item to the viewing user exceeds a threshold value, the online system 140 increases the bid amount. In some embodiments, the online system 140 increases the bid amount by a quantity that is directly related (e.g., proportional) to an amount by which the value of presenting the content item to the viewing user exceeds the threshold value. Conversely, the online system 140 may decrease the bid amount if the predicted value of presenting the content item to the viewing user is less than an alternative threshold amount; the bid amount may be decreased by an alternative quantity that is directly related (e.g., proportional) to an amount by which the predicted value is less than the alternative threshold amount. Alternatively, the online system 140 modifies a measure of relevance of the content item to the viewing user by a quantity based on an amount that the predicted value of presenting the content item to the viewing user exceeds a threshold value or an amount that the predicted value of presenting the content item to the viewing user is less than an alternative threshold value.

In other embodiments, the content item includes instructions for the online system 140 to determine a bid amount associated with the content item in one or more selection processes, and the online system 140 determines the bid amount associated with the content item based on the predicted value of presenting the content item to the viewing user. For example, the bid amount associated with the content item is directly related (e.g., directly proportional) to the predicted value of presenting the content item to the viewing user. Hence, the online system 140 determines higher bid amounts associated with the content item when the predicted value of presenting the content item to the user is higher. Similarly, a measure of relevance of the content item to the viewing user may be directly related (e.g., directly proportional) to the predicted value of presenting the content item to the viewing user in some embodiments.

In response to the one or more selection processes selecting the content item, the online system 140 communicates 345 the content item to a client device 110 associated with the viewing user for presentation. Thus, the predicted value of presenting the content item to the viewing user determined from the generated model affects a likelihood of the content item being presented to the viewing user. Hence, the generated model increases the likelihood of the content item being presented to a viewing user when presentation of the content item to the viewing user provide value to the third party system 130 associated with the content item.

Figure 4:
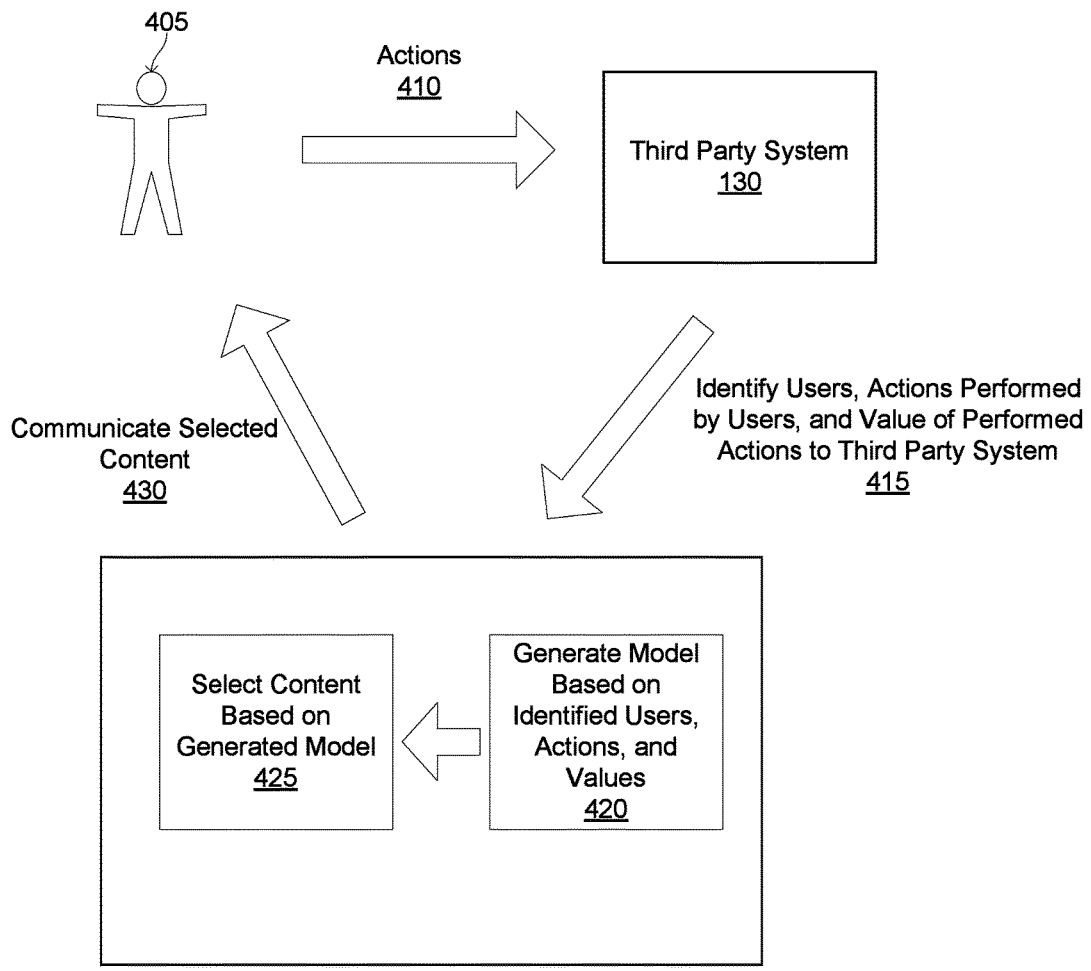
FIG. 4 is a process flow diagram of accounting for values of various actions to a third party system when selecting content for presentation to an online system user, in accordance with an embodiment.

FIG. 4 is a process flow diagram of selecting content for a user of an online system 140 based on values of various actions to a third party system 130. In the example of FIG. 4, a user 405 has been presented with various content items associated with the third party system 130 and performed various actions 410 after being presented with the content items. The actions 410 performed by the user 405 are identified to the third party system 130. Information identifying an action 410 performed by the user 405 includes information identifying the user to the third party system 130 and the action performed by the user.

The third party system 130 determines values to the third party system 130 of various actions 410 performed by the user 405 and identified to the third party system 130. As described above in conjunction with FIG. 3, the value to the third party system 130 of an action 410 performed by the user 405 represents a benefit to the third party system 130 of the action 410. The third party system 140 identifies 415 the user 405 and additional users who performed actions 410 to the online system 140, along with information identifying actions 410 performed by the user 405 and by the additional users as well as values to the third party system 130 of various performed actions 410. For example, the online system 140 receives information used by the third party system 130 to identify the user 405 in association with an action 410 performed by the user 405 that was captured by the third party system 130 and a value of the performed action to the third party system 130.

As further described above in conjunction with FIG. 3, the online system 140 obtains information maintained by the online system 130 describing presentation of one or more content items associated with the third party system 130. For example, the online system 140 determines identifiers of content items associated with the third party system 130 and obtains information maintained by the online system 140 including a determined identifier of a content item associated with the third party system 130 associated with the user 405 identified 415 by the third party system 130 as having performed an action. As the obtained information includes a time when a content item was presented to a user in association with the identifier of the content item and information identifying the user of the online system 140 corresponding to the user 405 identified 415 by the third party system 130 as having performed an action, the obtained information indicates when the content item associated with the third party system 130 was presented to the user 405. Hence, the obtained information allows the online system 140 to determine when the content item associated with the third party system 130 was presented to a user of the online system 140 identified by the third party system 130 to have performed an action.

Based on the obtained information describing presentation of the content item associated with the third party system 130 to the identified users, the actions performed by the identified users identified 415 by from the third party system 130, and the values of the actions performed by the identified users identified 415 by the third party system 130, the online system 140 generates 420 a model predicting a value to the third party system 130 for presenting a content item to the user 405. In some embodiments, the online system 140 generates 420 the model by applying weights to likelihoods of a user performing various actions after being presented with a content item and combines the weighted likelihoods to determine the value to the third party system 130 of presenting the content item to a user. Generation of the model is further described above in conjunction with FIG. 3. Subsequently, when the online system 140 identifies an opportunity to present content to the user 405, the online system 140 uses the generated model when selecting 425 content items, allowing the online system 140 to account for values to the third party system 130 of various actions when determining whether to present content items associated with the third party system 130 to the user 405, as further described above in conjunction with FIG. 3. The online system 140 communicates 430 selected content to a client device 110 associated with the user 405 for presentation to the user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving one or more content items at an online system for presentation to users of the online system;
   maintaining information describing presentation of a set of the received content items to users of the online system at the online system;
   receiving information from a third party system associated with a content item of the received one or more content items describing actions performed by users of the third party system, the information including information identifying one or more performed actions, values of the one or more performed actions to the third party system, and information identifying users of the third party system who performed the one or more actions;
   identifying users of the online system corresponding to the information identifying users of the third party system who performed the actions;
   determining information describing presentation of the content item to the identified users of the online system from the maintained information;
   generating a model predicting a value to the third party system of presenting the content item of the received one or more content items based on the information describing presentation of the content item to the identified users of the online system and the received values of the one or more performed actions, the model generated by applying one or more weights to one or more likelihoods of a user of the online system performing one or more actions after being presented with the content item and combining the one or more weighted likelihoods to determine the value to the third party system of presenting the content item of the received one or more content items to the user of the online system;
   identifying an opportunity to present content to a viewing user of the online system; and
   including the content item of the received one or more content items and the predicted value to the third party system of presenting the content item of the received one or more content items determined based on the model in one or more selection processes selecting the content for presentation to the viewing user.

2. The method of claim 1, further comprising:
   communicating the content item to a client device associated with the viewing user in response to the one or more selection processes selecting the content for presentation to the viewing user.

3. The method of claim 1, wherein the predicted value to the third party system of presenting the content item of the received one or more content items determined based on the model comprises a bid amount associated with the content item.

4. The method of claim 3 wherein including the content item of the received one or more content items and the predicted value to the third party system of presenting the content item of the received one or more content items determined based on the model in one or more selection processes selecting the content for presentation to the viewing user comprises:
   increasing the bid amount by a quantity directly related to an amount by which a value to the third party system of presenting the content item to the viewing user predicted by the model exceeds a threshold value; and
   including the content item in association with the increased bid amount in the one or more selection processes.

5. The method of claim 3 wherein including the content item of the received one or more content items and the predicted value to the third party system of presenting the content item of the received one or more content items determined based on the model in one or more selection processes selecting the content for presentation to the viewing user comprises:
   decreasing the bid amount by a quantity directly related to an amount by which a value to the third party system of presenting the content item to the viewing user predicted by the model exceeds a threshold value; and
   including the content item in association with the decreased bid amount in the one or more selection processes.

6. The method of claim 3, wherein including the content item of the received one or more content items and the predicted value to the third party system of presenting the content item of the received one or more content items determined based on the model in one or more selection processes selecting the content for presentation to the viewing user comprises:
   determining the bid amount associated with the content item based on the predicted value of presenting the content item to the viewing user; and
   including the content item in association with the determined bid amount in the one or more selection processes.

7. The method of claim 1, wherein including the content item of the received one or more content items and the predicted value to the third party system of presenting the content item of the received one or more content items determined based on the model in one or more selection processes selecting the content for presentation to the viewing user comprises:
   determining a measure of relevance of the content item to the viewing user based on the predicted value of presenting the content item to the viewing user; and
   including the content item in association with the determined measure of relevance in the one or more selection processes.

8. The method of claim 1, wherein identifying users of the online system corresponding to the information identifying users of the third party system who performed the actions comprises:
   identifying users of the online system associated with information received by the online system from a client device that presented the content item that matches information identifying users of the third party system who performed the one or more actions included in the received information.

9. The method of claim 1, wherein identifying users of the online system corresponding to the information identifying users of the third party system who performed the actions comprises:
   identifying a user of the online system associated with information used by the online system to identify the user of the online system that matches received information used by the third party system to identify a user of the third party system who performed an action.

10. The method of claim 1, wherein a value of a performed action to the third party system comprises a monetary amount indicating revenue obtained by the third party system because of the performed action.

11. The method of claim 1, wherein a value of a performed action to the third party system comprises a value of the performed action relative to values to the online system of one or more other actions.

12. A computer program product comprising a non-transitory computer readable storage medium having instructions encoded thereon that, when executed by a processor, cause the processor to:
receive one or more content items at an online system for presentation to users of the online system;
maintain information describing presentation of a set of the received one or more content items to users of the online system at the online system;
receive information from a third party system associated with a content item of the received one or more content items describing actions performed by users of the third party system, the information including information identifying one or more performed actions, values of the one or more performed actions to the third party system, and information identifying users of the third party system who performed the one or more actions;
identify users of the online system corresponding to the information identifying users of the third party system who performed the actions;
determine information describing presentation of the content item to the identified users of the online system;
generate a model predicting a value to the third party system of presenting the content item of the received one or more content items based on the information describing presentation of the content item to the identified users of the online system and the received values of the one or more performed actions, the model generated by applying one or more weights to one or more likelihoods of a user of the online system performing one or more actions after being presented with the content item and combining the one or more weighted likelihoods to determine the value to the third party system of presenting the content item of the received one or more content items to the user of the online system;
identify an opportunity to present content to a viewing user of the online system; and
include the content item of the received one or more content items and the predicted value to the third party system of presenting the content item of the received one or more content items determined based on the model in one or more selection processes selecting the content for presentation to the viewing user.

13. The computer program product of claim 12, wherein the computer readable medium further has instructions encoded thereon that, when executed by the processor, cause the processor to:
communicate the content item to a client device associated with the viewing user in response to the one or more selection processes selecting the content for presentation to the viewing user.

14. The computer program product of claim 12, wherein the predicted value to the third party system of presenting the content item of the received one or more content items determined based on the model comprises a bid amount associated with the content item.

15. The computer program product of claim 14, wherein include the content item of the received one or more content items and the predicted value to the third party system of presenting the content item of the received one or more content items determined based on the model in one or more selection processes selecting the content for presentation to the viewing user comprises:
increase the bid amount by a quantity directly related to an amount by which a value to the third party system of presenting the content item to the viewing user predicted by the model exceeds a threshold value; and
include the content item in association with the increased bid amount in the one or more selection processes.

16. The computer program product of claim 14, wherein include the content item of the received one or more content items and the predicted value to the third party system of presenting the content item of the received one or more content items determined based on the model in one or more selection processes selecting the content for presentation to the viewing user comprises:
decrease the bid amount by a quantity directly related to an amount by which a value to the third party system of presenting the content item to the viewing user predicted by the model exceeds a threshold value; and
include the content item in association with the decreased bid amount in the one or more selection processes.

17. The computer program product of claim 14, wherein include the content item of the received one or more content items and the predicted value to the third party system of presenting the content item of the received one or more content items determined based on the model in one or more selection processes selecting the content for presentation to the viewing user comprises:
determine the bid amount associated with the content item based on the predicted value of presenting the content item to the viewing user; and
include the content item in association with the determined bid amount in the one or more selection processes.

18. The computer program product of claim 12, wherein include the content item of the received one or more content items and the predicted value to the third party system of presenting the content item of the received one or more content items determined based on the model in one or more selection processes selecting the content for presentation to the viewing user comprises:
determine a measure of relevance of the content item to the viewing user based on the predicted value of presenting the content item to the viewing user; and
include the content item in association with the determined measure of relevance in the one or more selection processes.

19. The computer program product of claim 12, wherein a value of a performed action to the third party system comprises a monetary amount indicating revenue obtained by the third party system because of the performed action.

20. The computer program product of claim 12, wherein a value of a performed action to the third party system comprises a value of the performed action relative to values to the online system of one or more other actions.

* * * * *